US008933574B2

(12) United States Patent
Song

(10) Patent No.: US 8,933,574 B2
(45) Date of Patent: Jan. 13, 2015

(54) METHOD AND APPARATUS FOR HARNESSING HYDRO-KINETIC ENERGY

(71) Applicant: SaeHeum Song, Skillman, PA (US)

(72) Inventor: SaeHeum Song, Skillman, PA (US)

( * ) Notice: Subject to any disclaimer, the term of this patent is extended or adjusted under 35 U.S.C. 154(b) by 0 days.

(21) Appl. No.: 13/964,500

(22) Filed: Aug. 12, 2013

(65) Prior Publication Data

US 2014/0159370 A1    Jun. 12, 2014

Related U.S. Application Data

(62) Division of application No. 13/004,110, filed on Jan. 11, 2011, now Pat. No. 8,624,417.

(60) Provisional application No. 61/293,705, filed on Jan. 11, 2010, provisional application No. 61/308,994, filed on Mar. 1, 2010.

(51) Int. Cl.
    *F03B 13/10* (2006.01)
(52) U.S. Cl.
    USPC ............................................. 290/53; 290/42
(58) Field of Classification Search
    USPC ........................................ 290/42, 43, 53, 54
    See application file for complete search history.

(56) References Cited

U.S. PATENT DOCUMENTS

| | | | | |
|---|---|---|---|---|
| 3,730,643 | A * | 5/1973 | Davison | 416/8 |
| 5,758,911 | A * | 6/1998 | Gerhardt | 290/55 |
| 6,672,522 | B2 * | 1/2004 | Lee et al. | 290/55 |
| 7,709,971 | B2 * | 5/2010 | Sane et al. | 290/43 |
| 8,253,264 | B2 * | 8/2012 | Becker | 290/54 |
| 8,624,417 | B2 * | 1/2014 | Song | 290/53 |
| 8,759,996 | B2 * | 6/2014 | Song | 290/53 |
| 2009/0072539 | A1 | 3/2009 | Turner et al. | |

FOREIGN PATENT DOCUMENTS

| | | |
|---|---|---|
| WO | 0017519 | 3/2000 |
| WO | 2008091208 A1 | 7/2008 |

* cited by examiner

*Primary Examiner* — Nicholas Ponomarenko
(74) *Attorney, Agent, or Firm* — Arthur Jacob

(57) ABSTRACT

Apparatus and method is disclosed for generating usable power derived from oscillatory hydro-kinetic energy available in the movement of waves having a given height and being spaced apart by a predetermined distance at the surface of a body of water. Apparatus and method is disclosed for generating usable power derived from hydro-kinetic energy available in a body of water moving in at least one direction of movement, the at least one direction being substantially horizontal or substantially vertical. Apparatus and method is disclosed for generating usable power derived from hydro-gravitational forces available at a site having a source of water at a first elevation higher than a second elevation at a selected location where the usable power is to be derived.

9 Claims, 13 Drawing Sheets

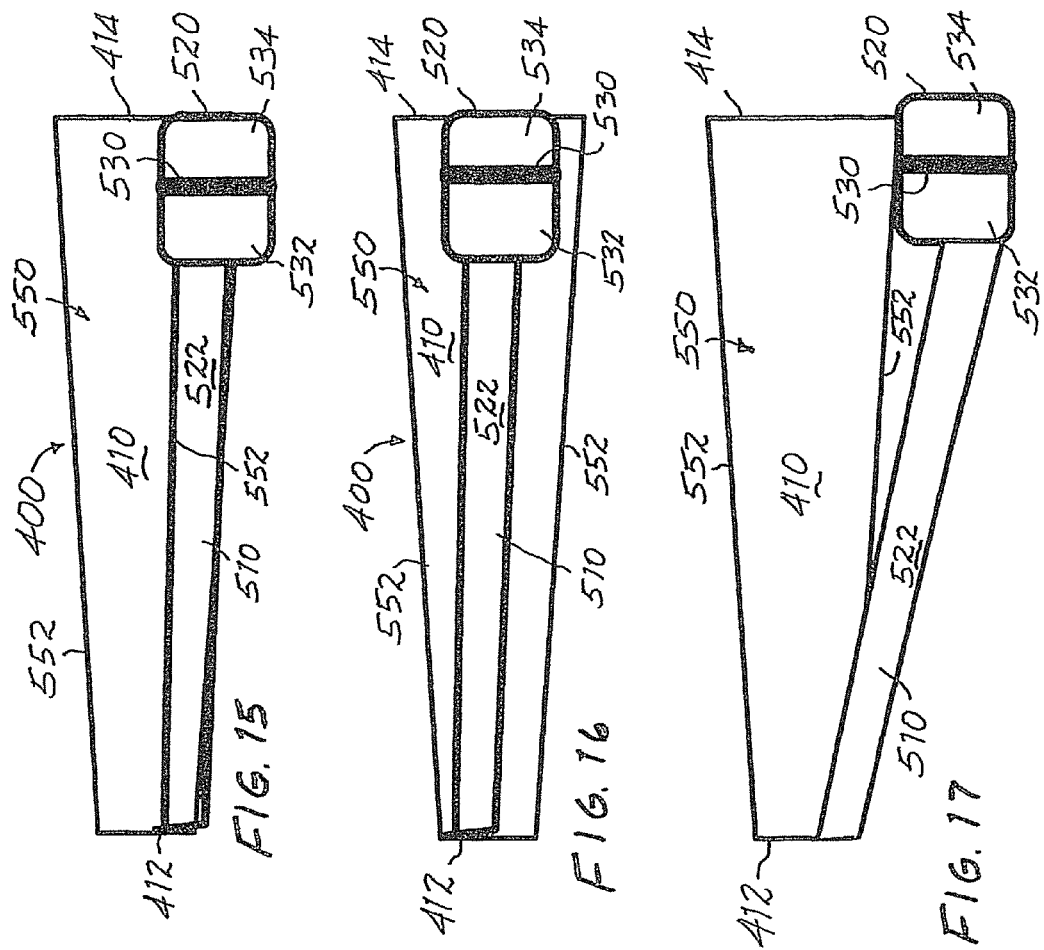

METHOD AND APPARATUS FOR HARNESSING HYDRO-KINETIC ENERGY

CROSS-REFERENCE TO RELATED APPLICATIONS

This is a division of application Ser. No. 13/004,110, filed Jan. 11, 2011, which application claims the benefit of U.S. Provisional Patent Application Ser. No. 61/293,705, filed Jan. 11, 2010, and U.S. Provisional Patent Application Ser. No. 61/308,994, filed Mar. 1, 2010, the entire disclosures of which are incorporated herein by reference thereto.

FIELD OF THE INVENTION

This invention relates generally to a system and method for harnessing hydro-kinetic energy from vertical, horizontal or oscillatory movement of water through unique devices and through reconstructing height differences in flowing bodies of water without the necessity for building a dam.

BACKGROUND OF THE INVENTION

The importance of utilizing natural clean renewable energy has emerged as critical in order to combat global warming. The major sources of natural clean energy are the sun, the ground, wind and water.

The use of natural energy to harness power from different sources is limited for different reasons. The use of the sun and wind energy is mostly limited by the Inconsistent availability of the energy source, depending upon weather, seasonal changes, and day and night cycles. The use of ground energy is limited by geographical location and by difficulties in drilling a few miles below the surface of the ground. Water is the most abundant source of clean energy, but the use of energy derived from water is limited by conventional technology that requires dam construction, high water flow, usually exceeding a few meters per second, and the complexity of corresponding energy harnessing devices.

Kinetic energy sources of water movement can be divided largely into three categories, (1) horizontal movement resulting from height differences between two locations in a river, or by tidal flow in the ocean, (2) vertical movement of water in a human built dam or fall, and (3) oscillatory wave movement originated from a combination of the horizontal and vertical movement of water, found mostly in the ocean.

Currently, the use of horizontal hydro-kinetic energy in a traditional water mill or propeller-type generator requires a minimum water flow of a few meters per second and is greatly restricted by geographical location. The method also lacks the ability to harness massive power. Several methods have been devised to harness massive energy, in mid-scale to large-scale power generation, based upon horizontal hydro-kinetic energy, including placing a turbine above a river, under a bridge. The method blocks natural water flow, similar to a dam, with the possibility of an occasional increased risk of flooding. The ability to harness horizontal hydro-kinetic energy with no or minimal water flow hindrance is a highly desirable goal. The present invention enables the harnessing of such energy with no or minimal water flow hindrance.

Currently, use of the vertical movement of water to harness hydro-kinetic energy is largely limited by the use of an existing natural fall, like Niagara, or by building a dam to hold water above a dam area to create height for harnessing hydro-kinetic energy. Building a dam has mixed advantages and disadvantages. Disadvantages include (1) changes, or even destruction, of an ecosystem, and (2) a requirement for a large scale relocation of people in the affected region. Harnessing vertical hydro-kinetic energy is highly desirable, and the present invention enables harnessing vertical hydro-kinetic energy by recreating height differences without the necessity for building a dam.

Current uses of oscillatory hydro-kinetic energy in several applications are summarized in http://www1.eere.energy.gov/windandhydro/hydrokinetic/default.aspx. These applications still require improvements in efficiency and ease of installation. The present invention provides a simple, highly effective and efficient way of harnessing oscillatory hydro-kinetic energy.

SUMMARY OF THE INVENTION

The present invention utilizes three different modalities to achieve the harnessing of hydro-kinetic energy, namely, (1) oscillatory, (2) horizontal, and (3) vertical, with a reconstruction of height.

The surface of sea water always oscillates, moving upward and downward in waves, in a "seesaw-like" movement. Direct harnessing of this mode of hydro-kinetic energy is not easy. The present invention makes use of "seesaw" power chambers filled with water. Wavel movements oscillate the seesaw power chambers up and down. Water inside the seesaw power chambers moves, based on changes in the relative slope between the seesaw power chambers. This moving water spins a power conversion unit to convert the hydro-kinetic energy inside the seesaw power chambers to usable electric power. Unidirectional flow devices can be located near the power conversion unit to effect unidirectional spinning of the power conversion unit. The rotation of the power conversion unit is used to generate hydro-electric power, using a generator. The power chambers are constructed to facilitate the movement of water from one power chamber to the other, in response to the seesaw motion, and to drive the power conversion unit for the effective and efficient generation of electric power and to enable seamless energy production.

Power generation along the surface of flowing water using a propeller-type small water turbine system has been in use for a very long time. However, the installation and scale of such a system is limited, based on the flow rate of the water at the site of the application. The present invention uses a different system and method to harness the horizontal flow of water, based on simple flow dynamics. As an analogy, if someone places a ball on the top of flowing water, the ball will flow in the direction of the water flow. The present invention utilizes a method and system for harnessing such water flow by extending into the flow of water, a plurality of wide vanes spaced apart at predetermined distances, so as to be moved by the water in the direction of flow of the water. The wide vanes are linked together by a continuous belt or chain system so that each vane travels back to an origin. When the wide vanes are returned against the direction of the flow of the water, the vanes are retracted to minimize backward water flow resistance. The total available hydro-kinetic power follows the basic energy equation, energy equals one-half times mass times velocity$^2$ where mass is calculated by the unit area of the wide vane multiplied by the length of the belt or chain and velocity is the flow rate of the water at the system site. The present invention enables capturing hydro-kinetic energy with minimal flow rate by concentration and accumulation, using wide vane movements.

One of the well known methods and systems currently in use to harness gravitational hydro-kinetic energy includes the use of a dam. A dam utilizes the hydro-kinetic energy produced by gravitational forces generated by differences in height between the origin and the destination of water. Building a dam requires the relocation of local populations and can cause harmful ecological changes due to the huge area above the dam which will be submerged under water, and the creation of barriers to the natural movements of fish. The present invention provides a method and system which recreates height differences similar to those established by a dam, without requiring the building of a dam and the creation of a huge reservoir. In accordance with the present invention, water is moved downward inside of closed pipes to a given destination by means of gravitational hydro-kinetic forces. At the destination, the water exiting the closed pipes moves upward inside a closed tower, which is separated by a baffle into two parts, namely, a rising part that receives water from the origin and a power harnessing part. As the water reaches the top of the closed tower, the water will fall toward the lowest part of the tower to harness gravitational hydro-kinetic power, expressed as m times g times h, where m represent the mass of the water flow over a unit time, g represents gravitational force and h represents the height of the closed tower. This gravitational force creates a lower pressure area at the closed pipes to accelerate water flow rate. Since the pipes can be located outside of the water-way and can accelerate water flow rates by the gravitational hydro-forces, the present invention can be used to minimize potential flooding adjacent the bottle neck created in the vicinity of the water flow.

BRIEF DESCRIPTION OF THE DRAWING

FIGS. 15 through 17 are top plan views showing alternative constructions for the apparatus illustrated in FIG. 14.

DETAILED DESCRIPTION

Figure 1:
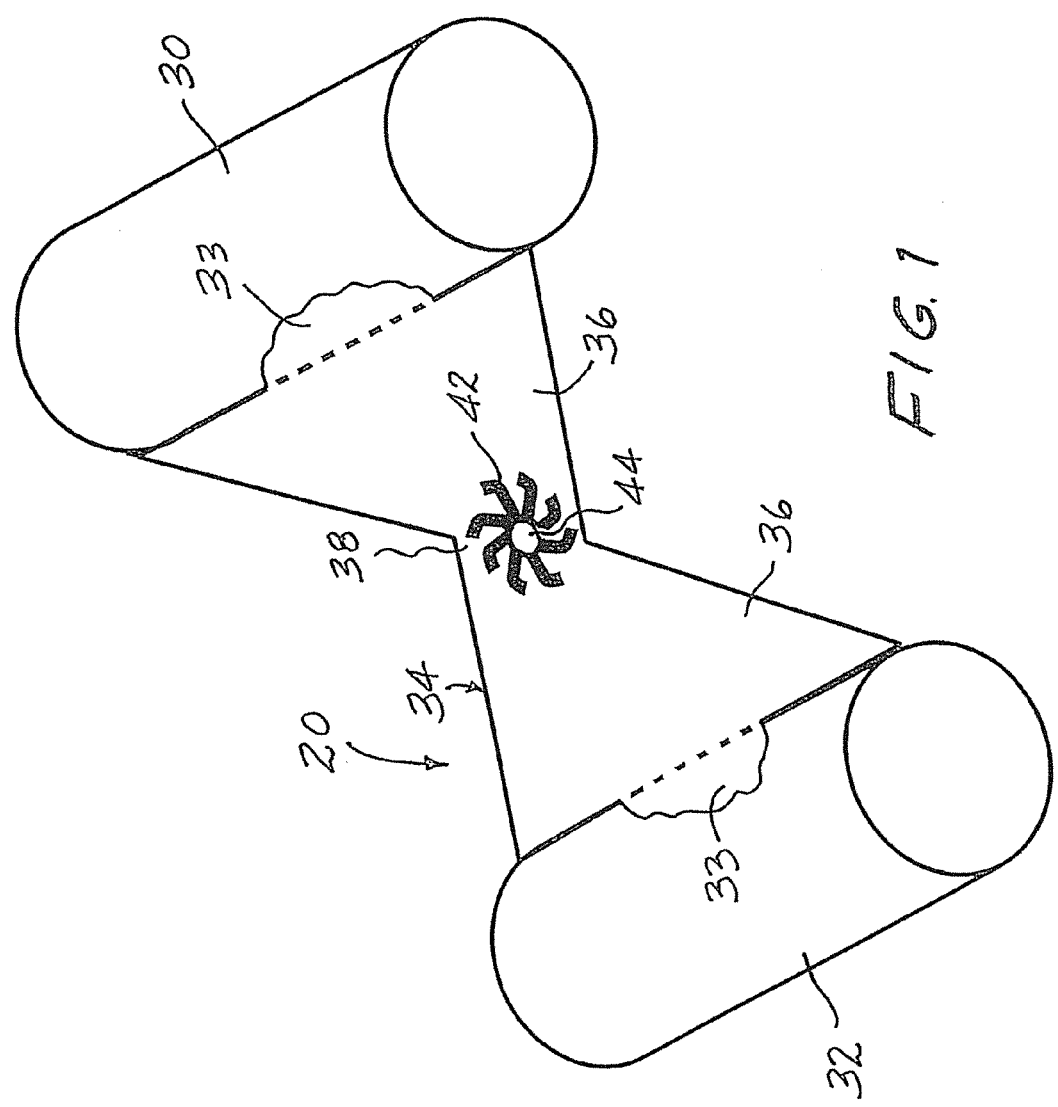
FIG. 1 is a largely diagrammatic pictorial view of an apparatus constructed in accordance with the present invention.

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

The present invention advantageously provides an electricity generation system and method utilizing hydro-kinetic energy that provides increased efficiency, weather durability and easier installation and manufacture.

The present invention also provides an electricity generation system and method that takes advantage of oscillatory hydro-kinetic energy.

The present invention also provides an electricity generation system and method that takes advantage of horizontal hydro-kinetic energy.

The present invention also provides an electricity generation system and method that can be used at lower levels of horizontal hydro-kinetic energy in a river or in the sea.

There is always wave movement in the ocean due to heat from the sun, wind, and forces resulting from relative movement between the earth and the moon. The waves have heights up to a few meters, depending on location. The amount of energy available is proportional to the volume of water in the wave and the frequency of movement.

The height of the wave varies by time and conditions. Therefore, it is difficult to harness power by simple piston movements, as found in many existing and proposed systems. In addition, efficiency can be doubled if a system could use both rising and falling wave movements.

There is always water flow in the sea for the reasons mentioned above, and in rivers as a result of altitude differences. Electric generation has been achieved using a propeller-type generator. Use of the propeller-type generator can injure fish or water animals when operating at high speed. Moreover, propeller-type systems require a medium to high water flow rate. Developing methods to harness energy over wider surroundings, or through or increased energy harness efficiency in a limited area can enable use of a low flow rate in electricity generation.

As set forth in the following detailed description, the present invention enables use of horizontal hydro-kinetic energy for electricity generation.

The present invention utilizes belt or chain type rotors to harness energy and enable capturing energy in a much wider area with high efficiency. This invention enables electric generation at lower flow rates and reduces fish or sea animal injury during the generation of electricity.

The present invention also provides method and systems for recreating gravitational hydro-kinetic energy.

Figure 2:
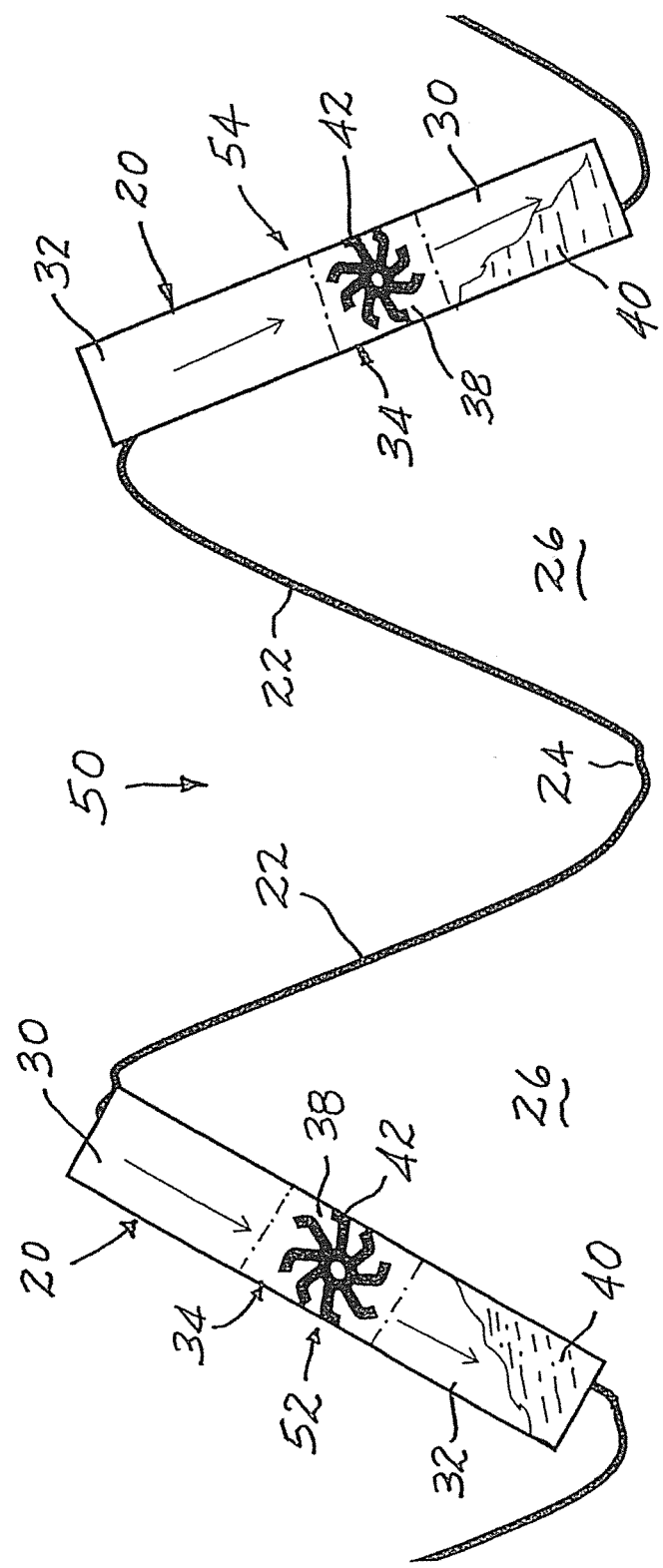
FIG. 2 is a schematic view showing the apparatus operating in accordance with a method of the present invention.

Referring now to the drawing, and especially to FIGS. 1 and 2 thereof, a wave kinetic energy harnessing apparatus constructed in accordance with the present invention is shown in the form of a "seesaw" power system 20 for harnessing oscillatory wave hydro-kinetic energy manifested in the form of waves 22 at the surface 24 of a body of water 26. Power system 20 includes power chambers in the form of tanks 30 and 32, each having an interior 33, and being interconnected by a conduit 34 providing passages 36 communicating with corresponding interiors 33 of tanks 30 and 32 to connect the interiors 33. Passages 36 are tapered down from each tank 30 and 32 toward a throat 38 located intermediate the tanks 30 and 32. A volume of a kinetic energy material, shown in the form of water 40, is contained within power system 20 and fills approximately less than one-half the total volume available within the system 20. An energy conversion device is shown in the form of a water-flow responsive drive wheel 42 journaled for rotation within throat 38 and coupled to an electrical power generator 44.

As best seen in FIG. 2, power system 20 is buoyant, is floated on the surface 24 of the body of water 26, and has a length between tanks 30 and 32 derived from the characteristics of the tidal waves 22 located at a particular installation site 50. That is, the spacing between tanks 30 and 32 preferably is set to somewhat less than the spacing between adjacent waves 22 experienced at site 50 so that as power system 20 floats on surface 24, power system 20 will be driven through a "seesaw" motion in which the relative elevation of tanks 30 and 32 will alternate between a first orientation, shown at 52, wherein tank 30 is up, elevated above tank 32, which is down, and water 40 flows from tank 30 to tank 32, and a second orientation, shown at 54, wherein tank 32 is up, elevated above tank 30, which is down, and water 40 flows from tank 32 to tank 30. As the water 40 passes between tanks 30 and 32, through conduit 34, drive wheel 42 is actuated by water 40 passing through throat 38, and the oscillatory tidal hydro-kinetic energy available at surface 24 of the body of water 26 is converted into usable electrical power by power generator 44.

Figure 3:
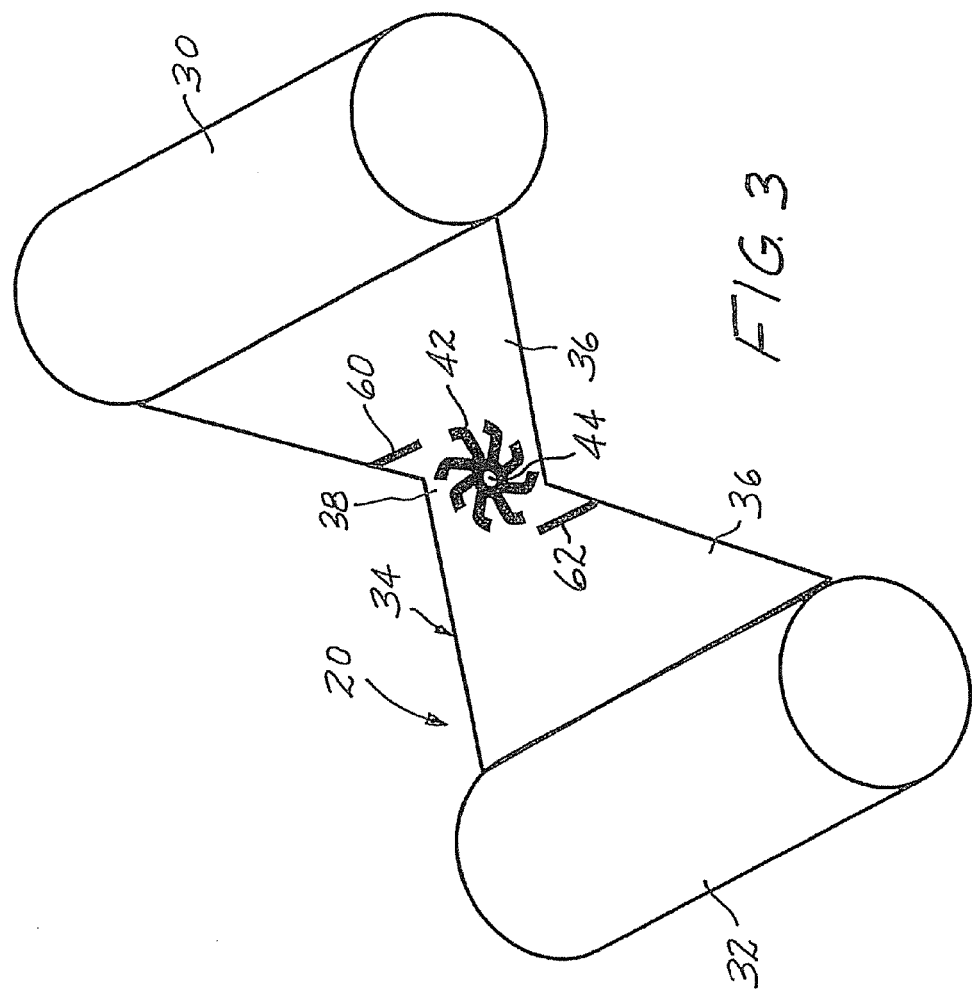
FIG. 3 is a largely diagrammatic pictorial view of another apparatus constructed in accordance with the present invention.

In the embodiment illustrated in FIG. 3, one-way flow controllers are added to power system 20 and are shown in the form of flow directors 60 and 62 located within conduit 34, adjacent throat 38. Flow directors 60 and 62 serve to control the flow of water 40 so that the flow of water 40 always is directed to the appropriate side of drive wheel 42, thereby increasing effectiveness and efficiency in the actuating of water wheel 42 by water 40.

Figure 4:
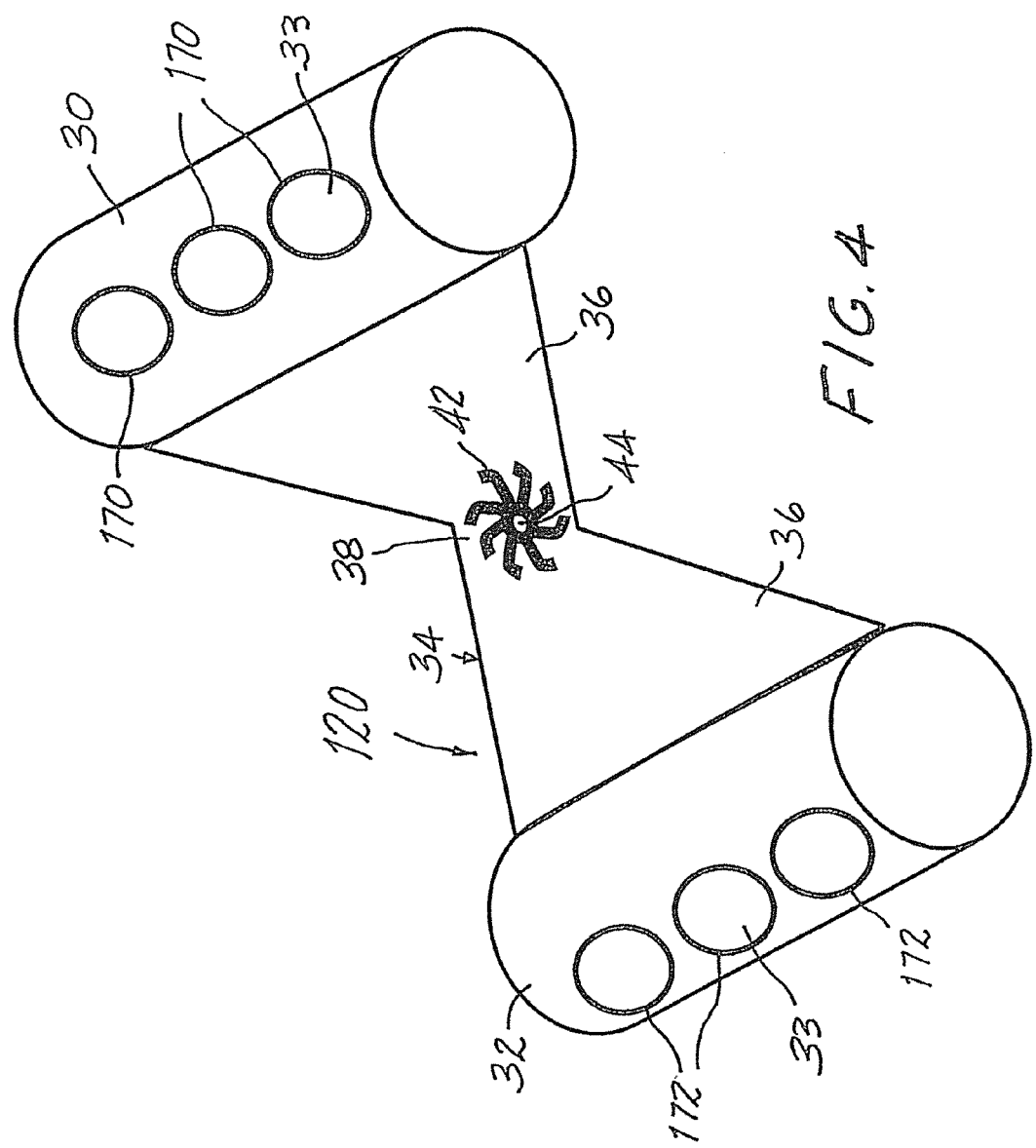
FIG. 4 is a largely diagrammatic pictorial view of still another apparatus constructed in accordance with the present invention.
Figure 5:
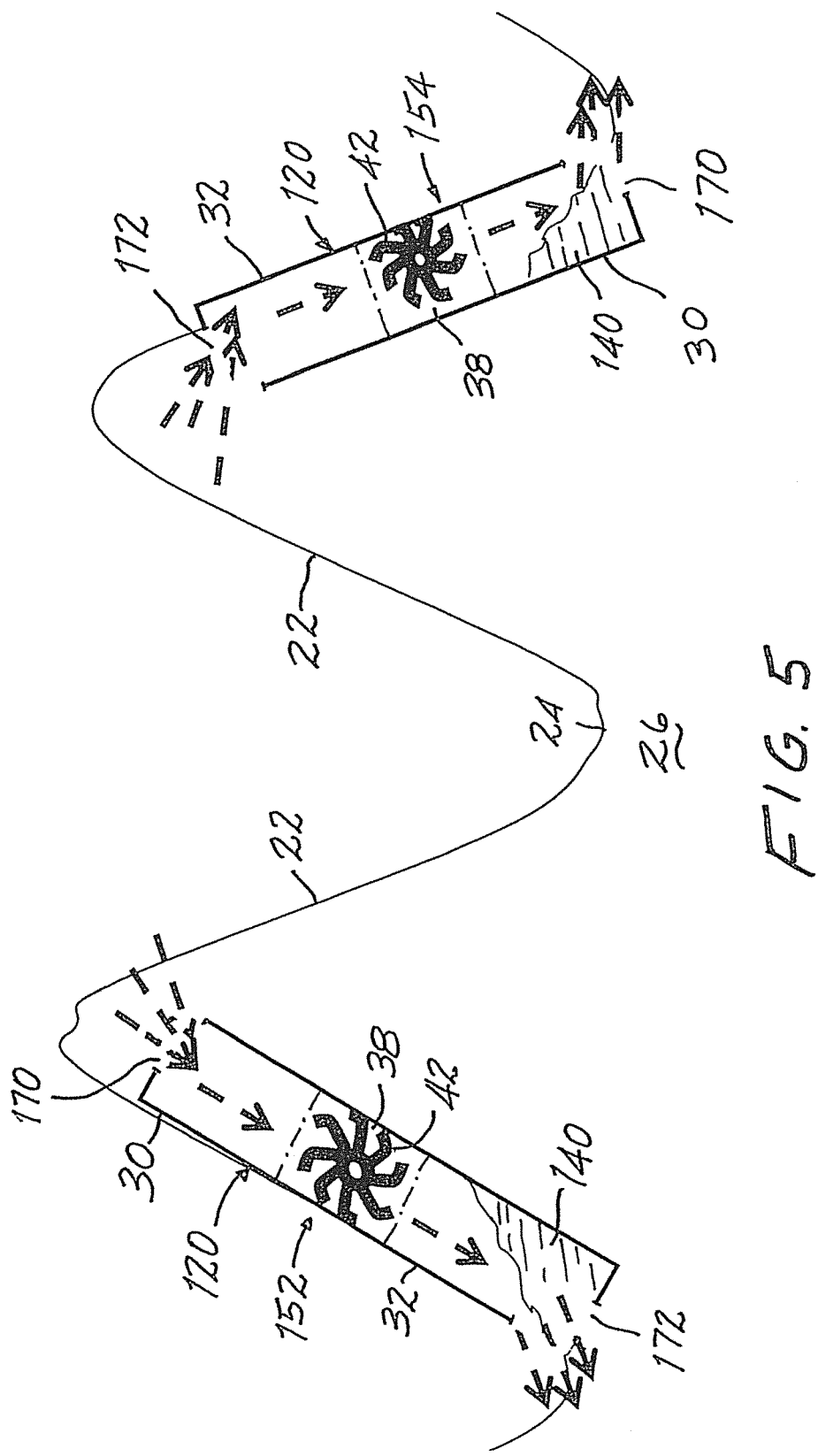
FIG. 5 is a schematic view showing the apparatus of FIG. 4 operating in accordance with a method of the present invention.

Turning now to FIGS. 4 and 5, a power system 120 is constructed similar to power system 20 described above, and the same reference characters are used to identify similar component parts. Thus, tanks 30 and 32 of power system 120 are similar to those of power system 20, with the exception of the addition of ports 170 and 172 which open corresponding tanks 30 and 32 for the passage of water from the body of water 26 into and out of the interior 33 of each tank 30 and 32. The ports 170 and 172 are located on tanks 30 and 32, respectively, such that upon riding the waves 22 at the surface 24 of the body of water 26, the tanks 30 and 32 will move through a "seesaw" motion as before; however, rather than rely upon a kinetic energy material carried inside the tanks 30 and 32, water from the body of water 26 is passed through the tanks 30 and 32 to harness oscillatory hydro-kinetic energy, as follows:

With particular reference to FIG. 5, power system 120 is driven through a "seesaw" motion in which the relative elevation of tanks 30 and 32 alternates from a first orientation, shown at 152, wherein tank 30 is up, elevated above tank 32, which is down, and water 140 flows from the body of water 26, through ports 170 into tank 30, and thence from tank 30 to tank 32 to exit through ports 172, and a second orientation, shown at 154, wherein tank 32 is up, elevated above tank 30, which is down, and water 140 flows from the body of water 26, through ports 172 into tank 32, and thence from tank 32 to tank 30 to exit through ports 170. As the water 140 passes between tanks 30 and 32, through conduit 34, drive wheel 42 is actuated by water 140 passing through throat 38, and the oscillatory tidal hydro-kinetic energy available at surface 24 of the body of water 26 is converted into usable electrical power by power generator 44.

Figure 6:
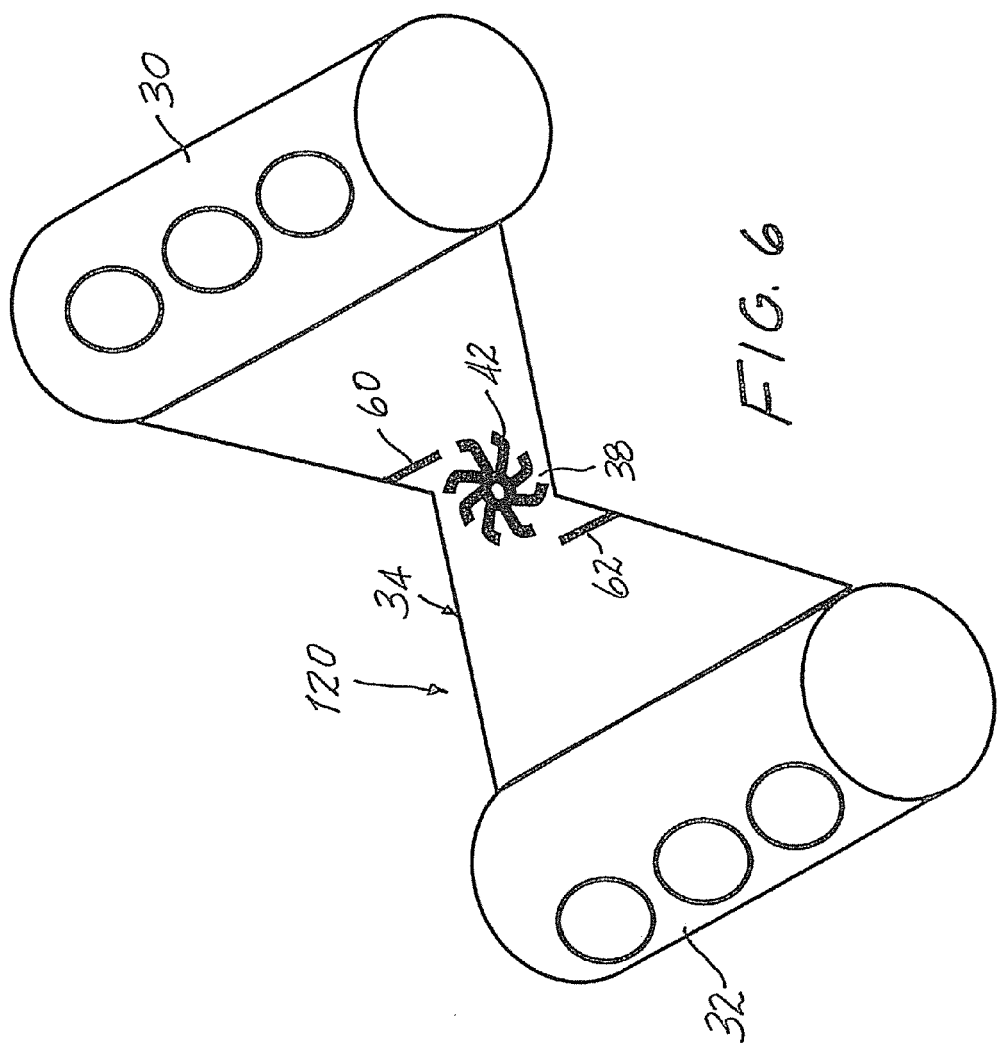
FIG. 6 is a largely diagrammatic pictorial view of yet another apparatus constructed in accordance the present invention.

In the embodiment illustrated in FIG. 6, one-way flow controllers added and are shown in the form of flow directors 60 and 62 located within conduit 34, adjacent throat 38. Flow directors 60 and 62 serve to control the flow of water 140 so that the flow of water 140 always is directed to the appropriate side of drive wheel 42, thereby increasing effectiveness and efficiency in the actuation of drive wheel 42 by water 140.

Figure 7:
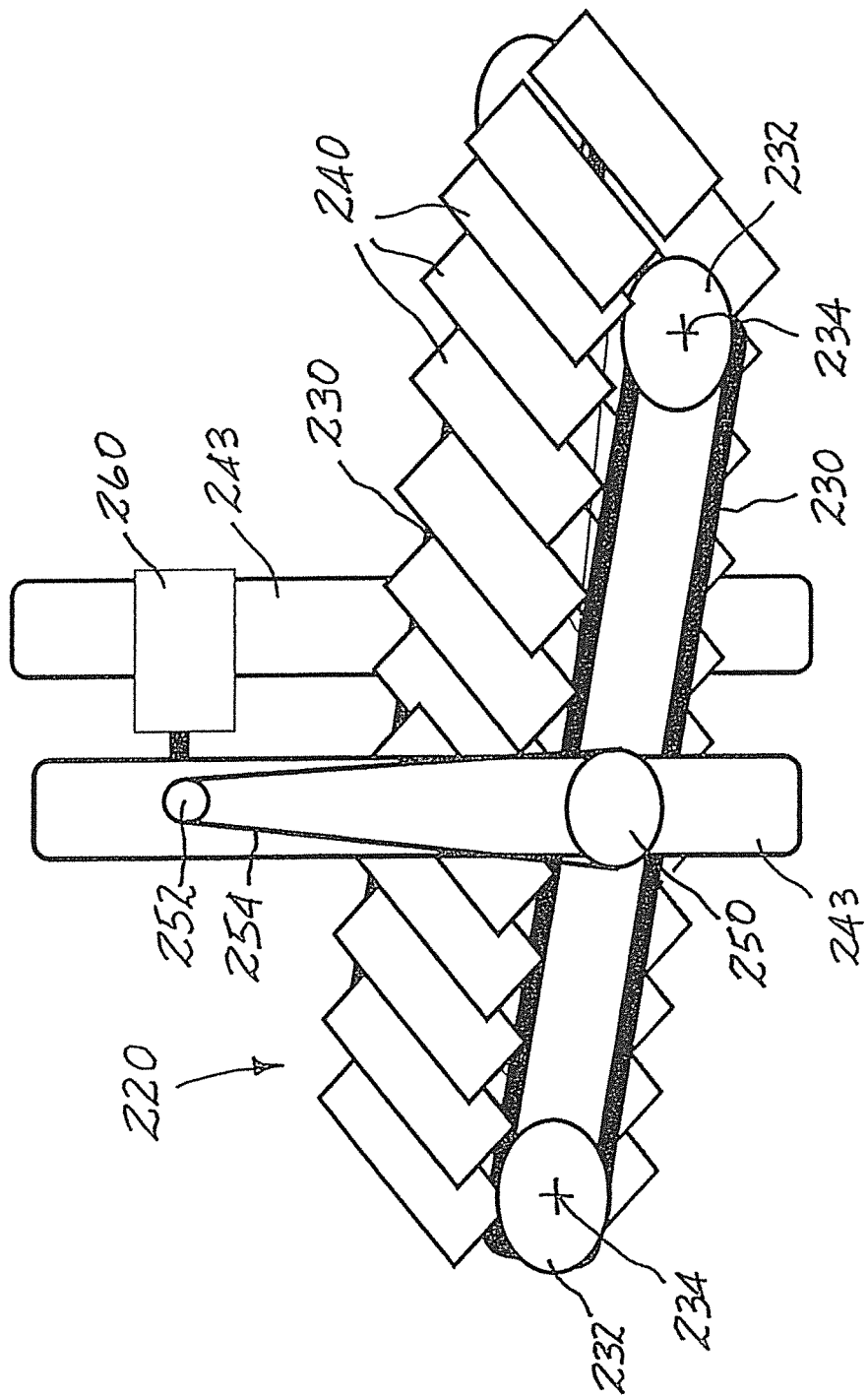
FIG. 7 is a largely diagrammatic pictorial view of another apparatus constructed in accordance with the present invention.
Figure 8:
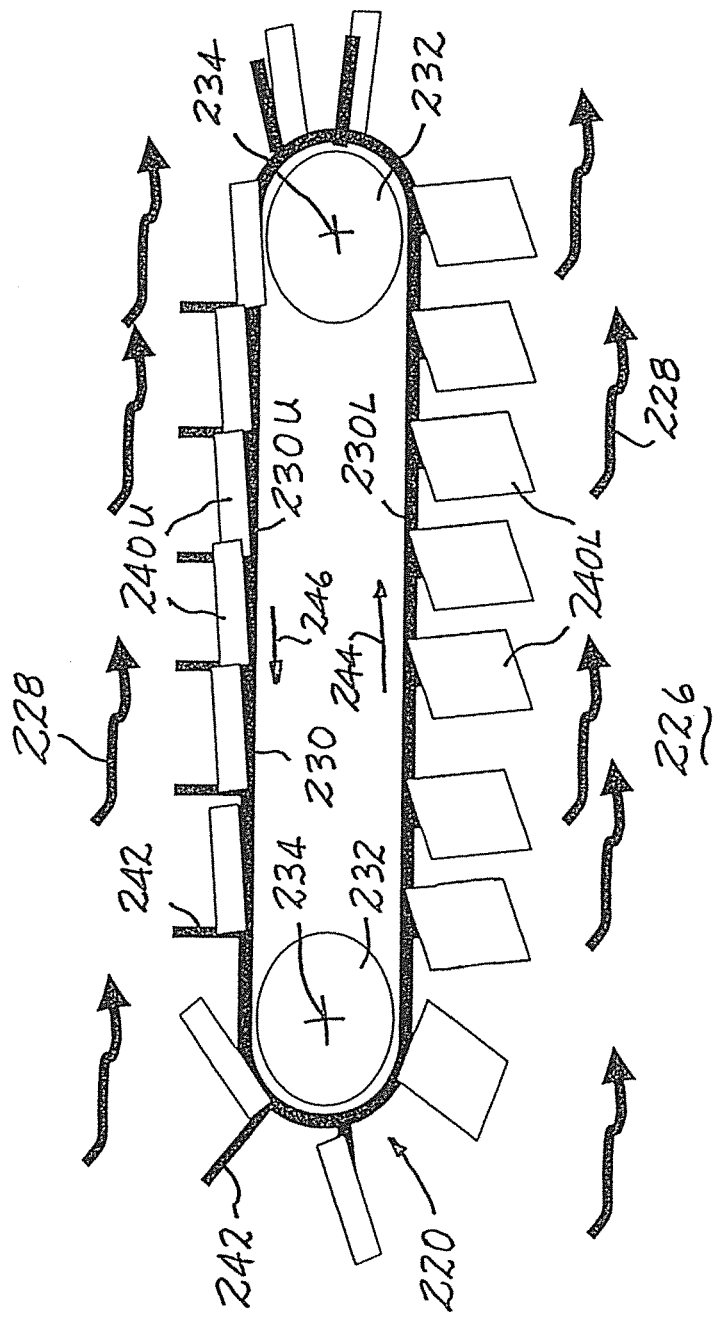
FIG. 8 is a largely schematic view showing the apparatus of FIG. 7 operating in accordance with a method of the present invention.

Referring now to FIGS. 7 and 8, a horizontal kinetic energy harnessing apparatus constructed in accordance with the present invention is shown in the form of a power system 220 for harnessing horizontal hydro-kinetic energy manifested in the form of water 226 flowing substantially horizontally, in the direction of arrows 228. Power system 220 includes a continuous, endless conveyor having a demand-based length and shown in the form of a pair of belts 230 mounted upon rollers 232 for movement along a closed loop path of travel as rollers 232 rotate about fixed axes of rotation 234. A multiplicity of vanes 240 are carried by belts 230, mounted upon supports 242 carried by the belts 230, for pivotal movement relative to the belts 230, as will be described below.

Belts 230, rollers 232 and vanes 240 are immersed in flowing water 226 and secured in place by stationary posts 243. As water 226 flows in the direction of arrows 228, vanes 240L along the lower legs 230L of belts 230 are pivoted by the water flow, as well as by gravity, to the orientation shown in FIG. 8, wherein the vanes 240L project substantially perpendicular to legs 230L to intercept the water flow for being driven by the flow of water 226 to advance the legs 230L of belts 230 in a direction of advancement indicated by arrows 244. At the same time, vanes 240U along the upper legs 230U of belts 230 are retracted by the water flow, as well as by gravity, into an orientation wherein the vanes 240U lie substantially parallel to belts 230, adjacent upper legs 230U, so as to minimize any resistance to the movement of legs 230U in the return direction depicted by arrow 246, as legs 230L are advanced. Belts 230 are coupled with a drive wheel 250 which, in turn, is coupled to a driven wheel 252 through a drive belt 254, and a generator 260 is coupled to driven wheel 252 for actuation to generate electrical power derived from the hydro-kinetic energy of flowing water 226.

Power system 220 is quite versatile and can be immersed to almost any depth in flowing water to harness kinetic energy available in the water, and can be used in any one of many positions in order to maximize the capture of horizontal hydro-kinetic energy present in flowing water.

Figure 9:
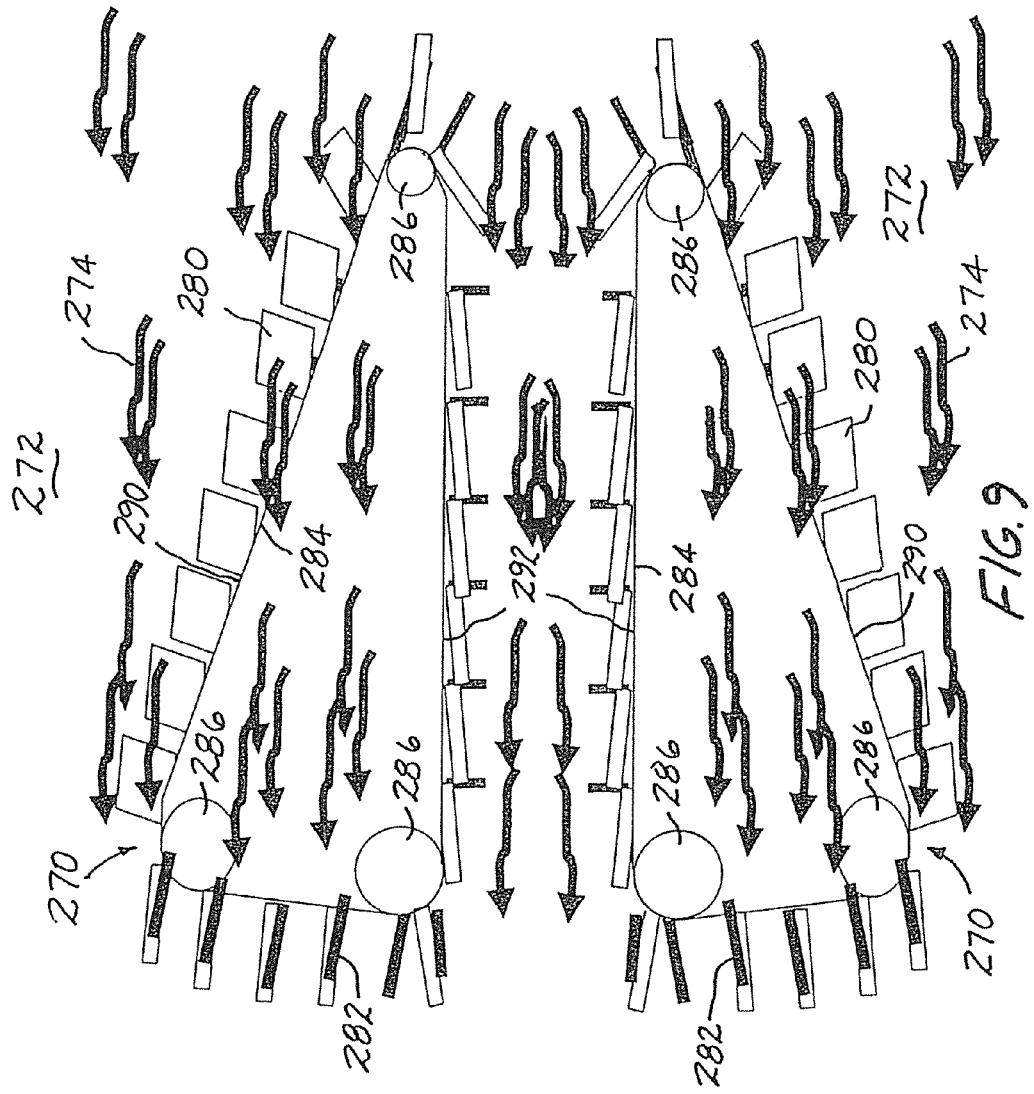
FIG. 9 is a largely diagrammatic and schematic view of another apparatus constructed in accordance with the present invention and operating in accordance with a method of the present invention.

In FIG. 9, two power systems 270, constructed similar to the construction of power system 220, are immersed in a body of water, the two power systems 270 being spaced apart horizontally in a field of water 272 flowing in the direction of arrows 274. As in the embodiment described above, each power system 270 is provided with vanes 280 on supports 282 carried by belts 284 coupled to rollers 286. As water 272 flows in the direction of arrows 274, the vanes 280 along one side 290 of each power system 220 are raised from a corresponding belt 284 to be driven by the flowing water 272, while the vanes 280 along the other side 292 of each power system 220 are retracted so as not to impede the movement of belts 284. The belts 284 are coupled to generators (not shown) to convert the kinetic energy present in the flowing water 272 to electrical power.

Power systems 270 are provided with a wedge-like configuration in which forward ends 294 are narrower than rearward ends 296. In this manner, the flow of water 272 is accelerated along each power system 270 for greater effectiveness in harnessing the kinetic energy available in the flowing water 272.

Figures 10A, 10B:
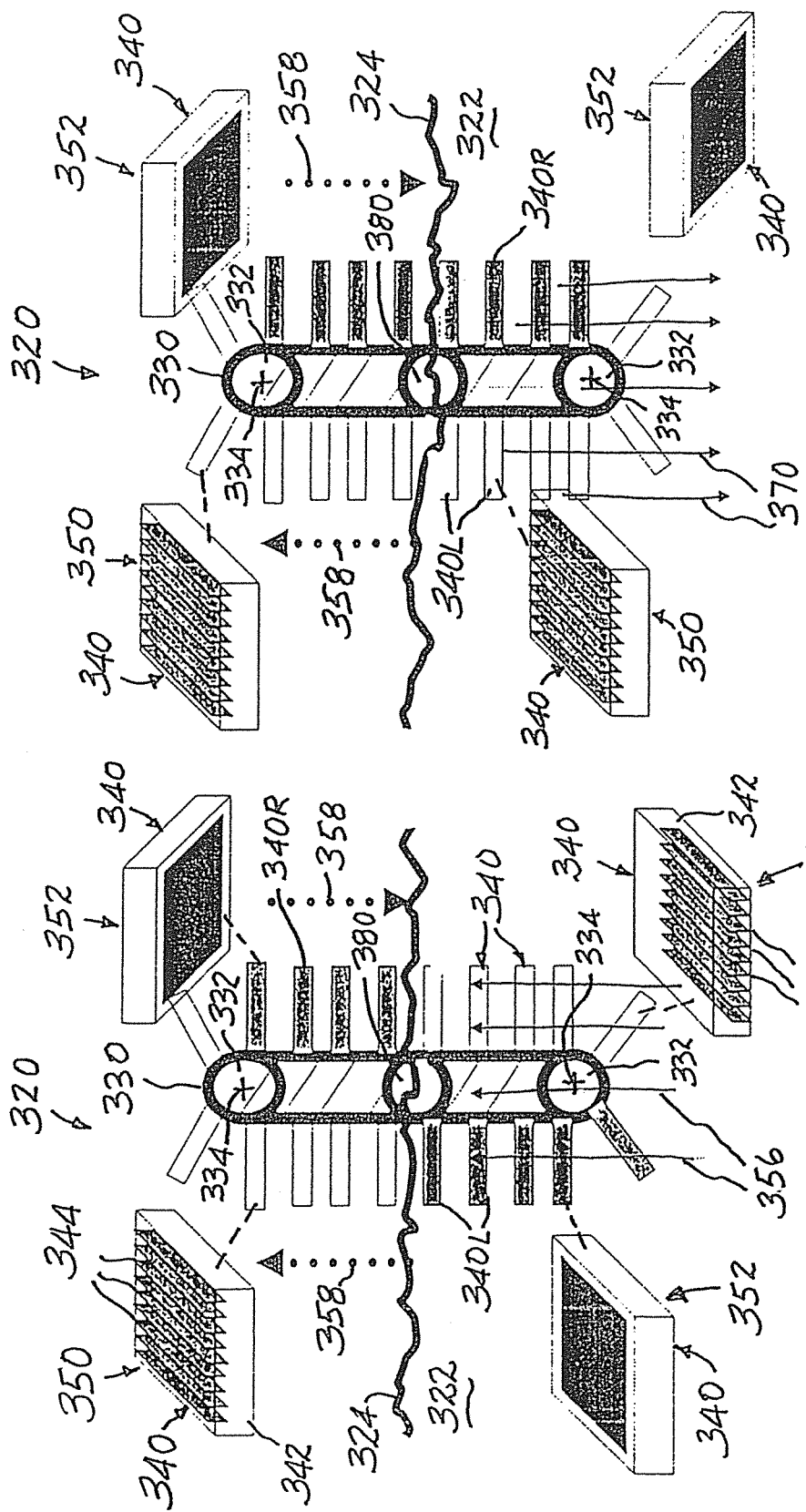
FIGS. 10A and 10B are largely diagrammatic and schematic views of another apparatus constructed in accordance with the present invention and operating in accordance with a method of the present invention.

Referring now to FIGS. 10A and 10B, a wave kinetic energy harnessing apparatus constructed in accordance with the present invention is shown in the form of a power system 320 for harnessing vertical hydro-kinetic energy. Power system 320 is shown installed in a body of wave water 322 where the level of the surface 324 of the water 322 rises and falls in accordance with an oscillatory movement in a wave cycle. Power system 320 includes a belt 330 that extends around upper and lower rollers 332 mounted for rotation about substantially horizontal, vertically spaced apart axes of rotation 334 which are fixed in place relative to the rising and falling surface 324 of water 322. A plurality of impellers 340 are carried by belt 330 and project from the belt 330, generally perpendicular to the belt 330. Each impeller 340 includes a frame 342 within which vanes 344 are mounted for pivotal movement between an open frame orientation, as seen at 350, and a closed frame orientation, as seen at 352.

During a rising wave, as depicted in FIG. 10A by arrows 356, the force of the rising water 322 against the vanes 344 of submerged left impellers 340L moves the vanes 344 into a closed frame orientation 352 and drives the belt 330 in an advancing direction, depicted by arrows 358. As each impeller 340L rises above the surface 324 of water 322, the corresponding vanes 344 will become free to move back to the open frame orientation 350, in response to the biasing force of gravity, in which orientation any water or other matter within an impeller 340L is released, and any air or water resistance is minimized, so that impellers 340L offer little resistance to continued movement of belt 330, along a closed looped path of travel, in the direction of arrows 358. Upon rounding the upper one of rollers 332, each frame 342 will be inverted as the corresponding impeller 340 becomes a right impeller 340R, and the vanes 344 of those impellers 340R located above surface 324 of water 322 will move to a closed frame orientation 352 in response to the biasing force of gravity. In the closed frame orientation of vanes 344, water in the vicinity can accumulate within those impellers 340R which are above surface 324, and the weight of such water will assist in moving the belt 330 in the direction of arrows 358. Upon movement of impellers 340R into water 322, the vanes 344 of submerged impellers 340R will be biased, by the force of water 322 against the vanes 344, into the open frame orientation 350, offering little resistance to downward movement of submerged impellers 340R and continued advancement of belt 330 in the direction of arrows 358.

During a falling wave, as depicted in FIG. 10B by arrows 370, the force of the falling level of water 322 against the vanes 344 of submerged right impellers 340R will maintain the vanes 344 in the closed frame orientation 352 and, along with enlistment of the force of gravity acting upon any water-filled right impellers 340R located above surface 324 of water 322, will drive the belt 330 in the direction of arrows 358. As each impeller 340R rounds the lower one of the rollers 332, each frame 342 will be inverted as the corresponding impeller becomes a left impeller 340L, and the corresponding vanes 344 will move back to the open frame orientation 350, in response to the biasing force of the relatively downward movement of water 322 against the vanes 344 of submerged impellers 340L, and will continue to remain in the open frame orientation upon emerging from water 322, by the biasing force of gravity, in which orientation of vanes 344 impellers 340L offer little resistance to continued advance movement of belt 330 in the direction of arrows 358.

Belt 330 is coupled with a drive wheel 380 which, in turn, is coupled to a generator (not shown) so that upon advance movement of belt 330 in the direction of arrows 358, the vertical hydro-kinetic energy available in the body of wave water 322 is harnessed and converted to electrical power.

Figure 11:
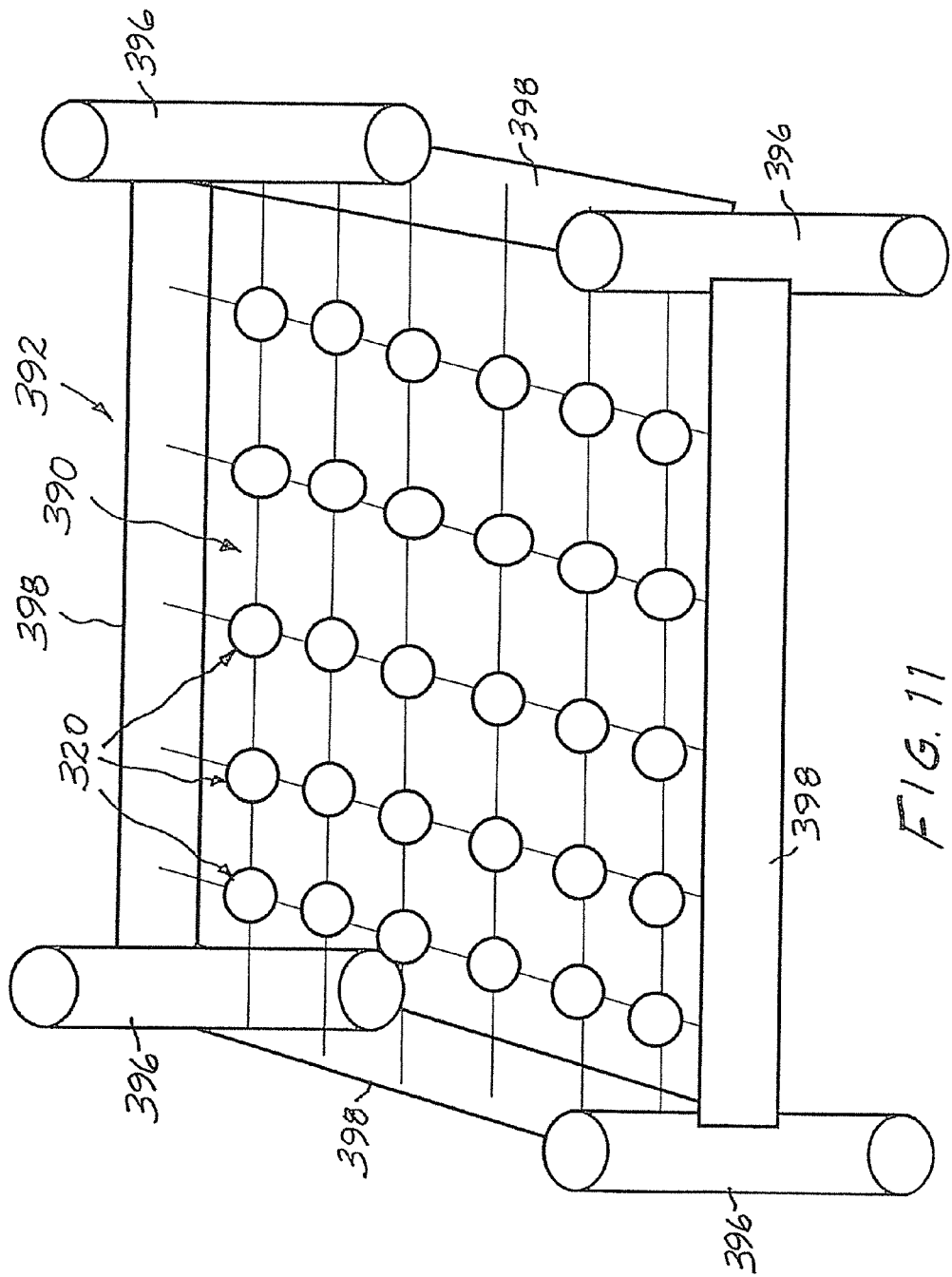
FIG. 11 is a diagrammatic and schematic view showing apparatus of FIGS. 10A and 10B in a matrix at an installation site.

As seen in FIG. 11, a multiplicity of power systems 320 are arranged in a matrix 390 spread over a relatively large area at an installation site 392. A framework 394 constructed of columns 396 and beams 398 support the multiple power systems 320, each fixed in place within matrix 390, for harnessing the tidal vertical hydro-kinetic energy available over the area of the installation site 392. Framework 394 may be buoyant for ease of movement to installation site 392, and then tethered or anchored in place once located at the installation site 392. Alternately, framework 394 can be constructed as a fixed structure at the installation site 392. Thus, even where the rise and fall of waves may not be great, or the time between rise and fall may be spread out, the field of multiple power systems 320 will derive suitable amounts of electrical power from the available vertical hydro-kinetic energy.

Figure 12:
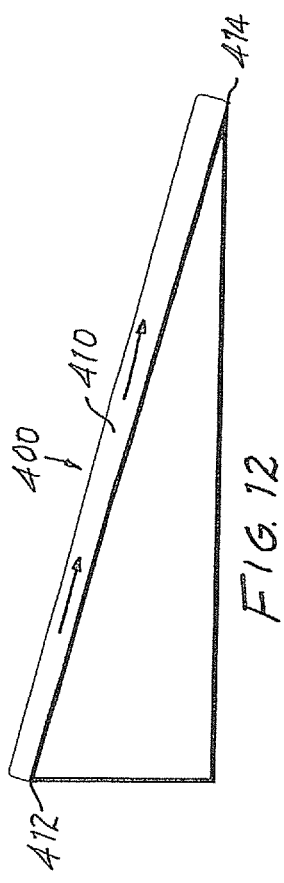
FIG. 12 is a diagrammatic elevational view showing a potential installation site.
Figure 13:
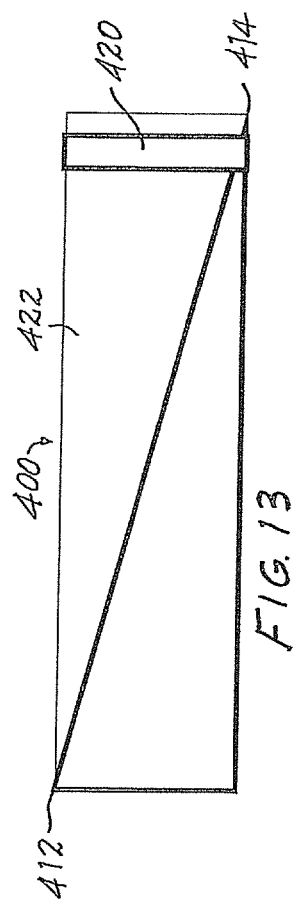
FIG. 13 is a diagrammatic elevational view showing a conventional installation for creating hydro-kinetic energy at the site depicted in FIG. 12.

Referring now to FIGS. 12 and 13, there is illustrated, diagrammatically, in FIG. 12, a potential site 400 for the installation of a system for harnessing gravitational hydro-kinetic energy available in water 410 flowing naturally from a higher elevation at 412 to a lower elevation at 414. Conventional installations generally call for the construction of a dam, as shown at 420 in FIG. 13. Dam 420 creates a very large water reservoir 422 behind the dam 420, establishing a source of energy which is tapped by releasing the water 410 through a water-powered generator (not shown). However, the presence of a dam can have a very great adverse affect on the character of the area in which the dam is located, not the least of which is flooding to create the reservoir 422, often requiring the relocation of local populations, and causing irreversible disruptions to local ecological systems.

Figure 14:
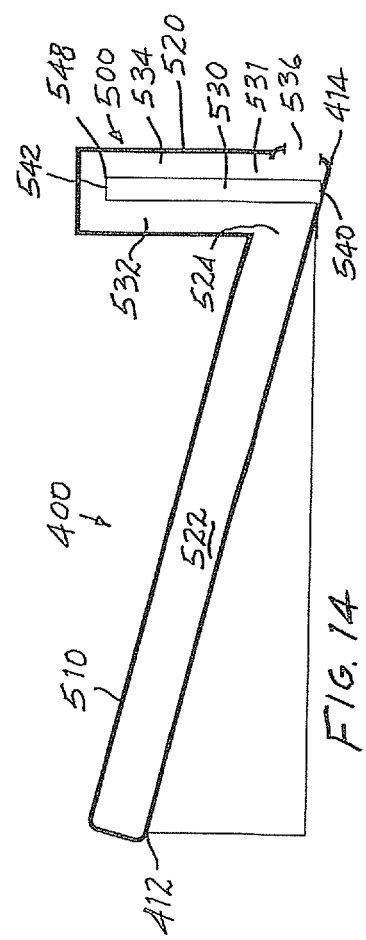
FIG. 14 is a diagrammatic elevational view showing another apparatus constructed in accordance with the present invention for creating hydro-kinetic energy at the site depicted in FIG. 12.

The embodiment of the present invention illustrated in FIG. 14 harnesses the gravitational hydro-kinetic energy available at the natural site 400, without the necessity for building a dam, and without significant disruption of the character of the area. To that end, a power system 500 includes a water duct in the form of a pipe 510 extending between the higher elevation 412 and the lower elevation 414. At the lower elevation 414, a tower 520 communicates with pipe 510 and water 522 is passed from the higher elevation 412, confined by pipe 510, to the lower elevation 414 and into tower 520 through an inlet 524. A baffle 530 is placed within the interior 531 of tower 520 and extends upwardly to a predetermined elevation adjacent the higher elevation 412 and divides the interior 531 of the tower 520 into a first chamber 532 and a second chamber 534. Water 522 enters the tower 520 through inlet 524 at the bottom of the first chamber 532, rises in the first chamber 532, and then spills over baffle 530 to flow downwardly through second chamber 534 to an outlet 536 to be passed to a water-driven generator (not shown). The height of baffle 530 extends from a basal end 540 to a top end 542 and establishes a reconstructed altitude from which water 522 flows downwardly at an accelerated rate of flow, thereby maximizing the energy derived from the flow of water 522 for optimum power generation. In the preferred construction, top end 542 of baffle 530 is placed adjacent the level of higher elevation 412, at an elevation 548 located just below the level of higher elevation 412.

At the same time, the impact on the site 400 is minimized. With reference to FIGS. 15 through 17, as well as to FIG. 14, pipe 510 is a generally tubular construction in which the pipe 510 essentially is closed to the surroundings along the length of the pipe 510. Moreover, the pipe 510 has a relatively narrow width, as viewed in plan, and can be located along a run 550 which is significantly wider than the pipe 510, enabling naturally flowing water 410 to bypass the pipe 510 so as to cause very little disruption to the character of the area. To that end, pipe 510, and tower 520, can be located at one edge 552 of run 550, as seen in FIG. 15, between edges 552 of run 550, as shown in FIG. 16, or even spaced somewhat beyond an edge 552 of run 550, as illustrated in FIG. 17. In each of these arrangements, water 522 flows through pipe 510 at a lowered pressure inside the closed pipe 510, the pressure being determined by the selection of the level of elevation 548, enabling water 522 to be delivered from higher elevation 412 to lower elevation 414 as needed and with minimal risk of damage due to flooding.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. Apparatus for generating usable power derived from hydro-kinetic energy available in a body of water moving in at least one direction of movement, the apparatus comprising:
a continuous, endless conveyor for being immersed in the body of water, the conveyor being movable through a looped path of travel along which a first leg of the conveyor is advanced in a direction of advancement while a second leg of the conveyor is returned in a return direction, with the first and second legs aligned substantially with the direction of movement of the body of water, and with the conveyor held substantially stationary relative to the moving body of water; and
a plurality of vanes carried by the conveyor, the vanes being mounted on the conveyor for movement between a first orientation, wherein the vanes intercept the body of water for effecting advancement of the vanes with the movement of the body of water, and a second orientation, wherein the vanes permit relative movement between the body of water and the vanes;
the first and second legs of the conveyor both being arranged for at least partial immersion in the moving body of water as the body of water moves along the at least one direction such that the vanes along one of the first and second legs of the conveyor will be moved by the moving body of water into one of the first and second orientations, while the vanes along the other of the first and second legs will be moved by the moving body of water into the other of the first and second orientations, thereby effecting advancement of the conveyor along the looped path of travel; and
an energy conversion device coupled with the conveyor for actuation in response to advancement of the conveyor, to convert the advancement of the conveyor into usable power.

2. The apparatus of claim 1 wherein:
the one direction of movement of the body of water is along a substantially horizontal direction;
upon immersion of the first and second legs of the conveyor in the moving body of water, the first and second legs are aligned substantially along the one direction of movement of the body of water; and
the vanes are mounted upon the conveyor for pivotal movement in response to substantially horizontal forces exerted upon the vanes by the moving body of water such that the vanes along the first leg of the conveyor will be moved by the moving body of water into the first orientation, while the vanes along the second leg of the conveyor will be moved by the moving body of water into the second orientation, whereby the conveyor will be advanced along the looped path of travel.

3. The apparatus of claim 2 wherein the vanes, when in the first orientation, project from the conveyor, substantially perpendicular to the conveyor, and the vanes, when in the second orientation, are retracted to extend in substantially parallel alignment with the conveyor, adjacent the conveyor.

4. The apparatus of claim 1 wherein movement of the body of water is movement along opposite substantially vertical directions of movement;
upon immersion of the first and second legs of the conveyor in the moving body of water, the first and second legs are aligned substantially vertically along the opposite directions of movement of the body of water; and
the vanes are mounted upon the conveyor for movement in response to substantially vertically directed forces exerted upon the vanes by the moving body of water such that the vanes along the first leg of the conveyor will be moved by the moving body of water into the first orientation, while the vanes along the second leg of the conveyor will be moved by the moving body of water into the second orientation, whereby the conveyor will be advanced along the looped path of travel.

5. The apparatus of claim 4 including a plurality of frames mounted upon the conveyor, spaced apart from one another along the conveyor and projecting substantially perpendicular from the conveyor, and the vanes are mounted within the frames for movement relative to the frames between the first orientation and the second orientation.

6. A method for generating usable power derived from hydro-kinetic energy available in a body of water moving in at least one direction of movement, the method comprising:
immersing a continuous, endless conveyor in the body of water, the conveyor being movable through a looped path of travel along which a first leg of the conveyor is advanced in a direction of advancement while a second leg of the conveyor is returned in a return direction;
aligning the first and second legs of the conveyor substantially with the direction of movement of the body of water;
holding the conveyor substantially stationary relative to the moving body of water; and
mounting a plurality of vanes on the conveyor for movement between a first orientation, wherein the vanes intercept the body of water for effecting advancement of the vanes with the movement of the body of water, and a second orientation, wherein the vanes permit relative movement between the body of water and the vanes;
arranging the first and second legs of the conveyor for at least partial immersion in the moving body of water as the body of water moves along the at least one direction such that the vanes along one of the first and second legs of the conveyor are moved by the moving body of water into one of the first and second orientations, while the vanes along the other of the first and second legs are moved by the moving body of water into the other of the first and second orientations, thereby effecting advancement of the conveyor along the looped path of travel; and coupling an energy conversion device with the conveyor for actuation in response to advancement of the conveyor, to convert the advancement of the conveyor into usable power.

7. The method of claim 6 wherein:

the one direction of movement of the body of water is along a substantially horizontal direction;

upon immersion of the first and second legs of the conveyor in the moving body of water, aligning the first and second legs substantially along the one direction of movement of the body of water.

8. The method of claim 6 wherein movement of the body of water is movement along opposite substantially vertical directions of movement;

upon immersion of the first and second legs of the conveyor in the moving body of water, aligning the first and second legs substantially vertically along the opposite directions of movement of the body of water.

9. The method of claim 8 including moving those vanes located along the first leg into the first orientation for enlisting gravitational forces to assist in moving the conveyor in the direction of advancement.

* * * * *